US008660840B2

(12) United States Patent
Ananthapadmanabhan et al.

(10) Patent No.: US 8,660,840 B2
(45) Date of Patent: Feb. 25, 2014

(54) METHOD AND APPARATUS FOR PREDICTIVELY QUANTIZING VOICED SPEECH

(75) Inventors: Arasanipalai K. Ananthapadmanabhan, San Diego, CA (US); Sarath Manjunath, Bangalore (IN); Pengjun Huang, San Diego, CA (US); Eddie-Lun Tik Choy, Carlsbad, CA (US); Andrew P. Dejaco, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 571 days.

(21) Appl. No.: 12/190,524

(22) Filed: Aug. 12, 2008

(65) Prior Publication Data

US 2008/0312917 A1 Dec. 18, 2008

Related U.S. Application Data

(63) Continuation of application No. 10/897,746, filed on Jul. 22, 2004, now Pat. No. 7,426,466, which is a continuation of application No. 09/557,282, filed on Apr. 24, 2000, now abandoned.

(51) Int. Cl.

| | |
|---|---|
| ***G06F 15/00*** | (2006.01) |
| ***G10L 21/00*** | (2013.01) |
| ***G10L 21/02*** | (2013.01) |
| ***G10L 19/00*** | (2013.01) |

(52) U.S. Cl.
USPC .......................................... 704/230; 704/200

(58) Field of Classification Search
USPC .................. 704/200–230, E19.001–E19.003, 704/E19.008, E19.011–E19.017, E19.04
See application file for complete search history.

(56) References Cited

U.S. PATENT DOCUMENTS

| | | | | |
|---|---|---|---|---|
| 4,270,025 A * | 5/1981 | Alsup et al. | .................. | 704/217 |
| 4,901,307 A | 2/1990 | Gilhousen et al. | | |
| 5,023,910 A | 6/1991 | Thomson | | |
| 5,103,459 A | 4/1992 | Gilhousen et al. | | |

(Continued)

FOREIGN PATENT DOCUMENTS

| | | |
|---|---|---|
| EP | 0336658 | 10/1989 |
| EP | 0696026 | 2/1996 |

(Continued)

OTHER PUBLICATIONS

Cho Inhwan et al., "Predictive Pyramid vector quantisation of LSF parameters," Electronics Letters, IEEE Stevenage, GB, vol. 34, No. 8, Apr. 16, 1998, pp. 735-736. XP006009612.

(Continued)

*Primary Examiner* — Pierre-Louis Desir
*Assistant Examiner* — David Kovacek
(74) *Attorney, Agent, or Firm* — Heejong Yoo

(57) ABSTRACT

A method and apparatus for predictively quantizing voiced speech includes a parameter generator and a quantizer. The parameter generator is configured to extract parameters from frames of predictive speech such as voiced speech, and to transform the extracted information to a frequency-domain representation. The quantizer is configured to subtract a weighted sum of the parameters for previous frames from the parameter for the current frame. The quantizer is configured to quantize the difference value. A prototype extractor may be added to first extract a pitch period prototype to be processed by the parameter generator.

23 Claims, 7 Drawing Sheets

(56) References Cited

U.S. PATENT DOCUMENTS

| | | | | | |
|---|---|---|---|---|---|
| 5,113,448 | A * | 5/1992 | Nomura et al. | 704/219 |
| 5,233,660 | A * | 8/1993 | Chen | 704/208 |
| 5,247,579 | A * | 9/1993 | Hardwick et al. | 704/230 |
| 5,255,339 | A | 10/1993 | Fette et al. | |
| 5,265,190 | A * | 11/1993 | Yip et al. | 704/219 |
| 5,414,795 | A | 5/1995 | Tsutsui et al. | |
| 5,414,796 | A * | 5/1995 | Jacobs et al. | 704/221 |
| 5,546,498 | A * | 8/1996 | Sereno | 704/229 |
| 5,699,478 | A * | 12/1997 | Nahumi | 704/226 |
| 5,710,863 | A | 1/1998 | Chen | |
| 5,727,122 | A * | 3/1998 | Hosoda et al. | 704/223 |
| 5,727,123 | A | 3/1998 | McDonough et al. | |
| 5,752,222 | A * | 5/1998 | Nishiguchi et al. | 704/201 |
| 5,784,532 | A | 7/1998 | McDonough et al. | |
| 5,787,391 | A * | 7/1998 | Moriya et al. | 704/225 |
| 5,809,459 | A * | 9/1998 | Bergstrom et al. | 704/223 |
| 5,819,212 | A * | 10/1998 | Matsumoto et al. | 704/219 |
| 5,884,253 | A | 3/1999 | Kleijn | |
| 5,909,663 | A * | 6/1999 | Iijima et al. | 704/226 |
| 5,911,128 | A | 6/1999 | DeJaco | |
| 6,073,092 | A * | 6/2000 | Kwon | 704/219 |
| 6,104,992 | A * | 8/2000 | Gao et al. | 704/220 |
| 6,188,980 | B1 * | 2/2001 | Thyssen | 704/230 |
| 6,202,046 | B1 * | 3/2001 | Oshikiri et al. | 704/233 |
| 6,292,777 | B1 | 9/2001 | Inoue et al. | |
| 6,301,265 | B1 | 10/2001 | Kleider et al. | |
| 6,324,505 | B1 | 11/2001 | Choy et al. | |
| 6,330,535 | B1 * | 12/2001 | Yasunaga et al. | 704/223 |
| 6,377,914 | B1 * | 4/2002 | Yeldener | 704/205 |
| 6,393,394 | B1 | 5/2002 | Ananthapadmanabhan et al. | |
| 6,397,175 | B1 | 5/2002 | Manjunath | |
| 6,418,408 | B1 | 7/2002 | Udaya Bhaskar et al. | |
| 6,453,288 | B1 * | 9/2002 | Yasunaga et al. | 704/223 |
| 6,456,964 | B2 | 9/2002 | Manjunath et al. | |
| 6,507,814 | B1 * | 1/2003 | Gao | 704/220 |
| 6,535,847 | B1 | 3/2003 | Marston | |
| 6,574,593 | B1 * | 6/2003 | Gao et al. | 704/222 |
| 6,584,438 | B1 | 6/2003 | Manjunath et al. | |
| 6,636,829 | B1 * | 10/2003 | Benyassine et al. | 704/201 |
| 6,640,209 | B1 | 10/2003 | Das | |
| 6,678,649 | B2 | 1/2004 | Manjunath | |
| 6,691,084 | B2 | 2/2004 | Manjunath et al. | |
| 6,807,524 | B1 * | 10/2004 | Bessette et al. | 704/200.1 |
| 6,910,008 | B1 * | 6/2005 | Yasunaga et al. | 704/223 |
| 7,167,828 | B2 * | 1/2007 | Ehara | 704/223 |
| 7,272,556 | B1 * | 9/2007 | Aguilar et al. | 704/230 |
| 7,426,466 | B2 | 9/2008 | Ananthapadmanabhan et al. | |
| 7,505,899 | B2 * | 3/2009 | Serizawa | 704/219 |
| 2002/0016711 | A1 * | 2/2002 | Manjunath et al. | 704/258 |
| 2002/0138256 | A1 * | 9/2002 | Thyssen | 704/220 |
| 2004/0002856 | A1 * | 1/2004 | Bhaskar et al. | 704/219 |
| 2004/0176950 | A1 * | 9/2004 | Chu | 704/207 |
| 2005/0137864 | A1 * | 6/2005 | Valve et al. | 704/227 |
| 2008/0249766 | A1 * | 10/2008 | Ehara | 704/203 |
| 2010/0185442 | A1 * | 7/2010 | Sato et al. | 704/222 |

FOREIGN PATENT DOCUMENTS

| | | | |
|---|---|---|---|
| EP | 0926660 | | 6/1999 |
| EP | 0987680 | | 3/2000 |
| JP | 1128623 | A | 5/1989 |
| JP | 3003531 | A | 1/1991 |
| JP | 3153075 | A | 7/1991 |
| JP | 6259096 | A | 9/1994 |
| JP | 8044398 | A | 2/1996 |
| JP | 8076800 | A | 3/1996 |
| JP | 8179795 | A | 7/1996 |
| JP | 8185199 | A | 7/1996 |
| JP | 9319398 | A | 12/1997 |
| JP | 10124092 | A | 5/1998 |
| JP | 11003099 | A | 1/1999 |
| JP | 2002507011 | T | 3/2002 |
| JP | 2003532149 | | 10/2003 |
| WO | 9510760 | | 4/1995 |
| WO | WO9903097 | A2 | 1/1999 |
| WO | WO0000963 | A1 | 1/2000 |
| WO | 0010307 | | 2/2000 |
| WO | 0011659 | | 3/2000 |
| WO | 0106492 | | 1/2001 |
| WO | 0106495 | | 1/2001 |

OTHER PUBLICATIONS

European Search Report—EP08173008, Search Authority—Munich, Feb. 2, 2009.

European Written Opinion—EP08173009, Search Authority—Munich, Feb. 2, 2009.

"The IEEE Standard Dictionary of Electrical and Electronic Terms," Sixth Ed., Dec. 1996, pp. 934-935.

Gersho, A. et al., "Vector Quatization and Signal Compression," Ch. 11, Vector Quatization II: Optimality and Design, Kluwer Academic Publishers, Norwell, Massachusetts, 1992, pp. 345-400.

Gersho, A. et al., "Vector Quatization and Signal Compression," Ch. 12, Constrained Vector Quatization, Kluwer Academic Publishers, Norwell, Massachusetts, 1992, pp. 407-481.

Gersho, A. et al., "Vector Quatization and Signal Compression," Ch. 13, Predictive Vector Quatization, Kluwer Academic Publishers, Norwell, Massachusetts, 1992, pp. 487-517.

Gersho, A. et al., "Vector Quatization and Signal Compression," Ch. 14, Finite-State Vector Quantization, Kluwer Academic Publishers, Norwell, Massachusetts, 1992, pp. 519-553.

Gersho, A. et al., "Vector Quatization and Signal Compression," Ch. 16, Adaptive Vector Quatization, Kluwer Academic Publishers, Norwell, Massachusetts, 1992, pp. 587-629.

Gersho, A. et al., "Vector Quatization and Signal Compression," Ch. 17, Variable Rate Vector Quatization, Kluwer Academic Publishers, Norwell, Massachusetts, 1992, pp. 631-689.

Rabiner, L.R. et al., "Digital Processing of Speech Signals," Ch. 8, Linear Predictive Coding in Speech, Prentice Hall, Englewood Cliffs, New Jersey, 1978, pp. 396-453.

Kleijn, W. Bastiann, "Methods for Waveform Interpolation in Speech Coding," Digital Signal Processing, 1991, pp. 215-230.

Griggin, DW et al., "Multiband Excitation Vocoder," IEEE Transactions on Acoustics. Speech, and Signal Processing, Aug. 1988, vol. 36(8), pp. 1223-1235.

Almeida, L et al., "Harmonic Coding a Low Bit-Rate, Good Quality, Speech Coding Technique," IEEE International Conference on Acoustics, Speech, and Signal Processing, (ICASSP), May 1982, vol. 7, pp. 1664-1667.

International Search Report—PCT/US01/012988, International Search Authority—European Patent Office, Sep. 24, 2001.

International Preliminary Examination Report—PCT/US01/012988, IPEA—US, Dec. 27, 2002.

European Search Report—EP07105323, Search Authority—Munich—Jun. 25, 2007.

* cited by examiner

--PRIOR ART--

METHOD AND APPARATUS FOR PREDICTIVELY QUANTIZING VOICED SPEECH

This application is a continuation of U.S. application Ser. No. 10/897,746, filed on Jul. 22, 2004, issued as U.S. Pat. No. 7,426,466, which is a continuation of U.S. application Ser. No. 09/557,282, filed on Apr. 24, 2000 (abandoned), which are assigned to the assignee of the present application. U.S. application Ser. No. 10/897,746 and U.S. application Ser. No. 09/557,282 are hereby incorporated by reference.

BACKGROUND OF THE INVENTION

1. Field

The present invention pertains generally to the field of speech processing, and more specifically to methods and apparatus for predictively quantizing voiced speech.

2. Background

Transmission of voice by digital techniques has become widespread, particularly in long distance and digital radio telephone applications. This, in turn, has created interest in determining the least amount of information that can be sent over a channel while maintaining the perceived quality of the reconstructed speech. If speech is transmitted by simply sampling and digitizing, a data rate on the order of sixty-four kilobits per second (kbps) is required to achieve a speech quality of conventional analog telephone. However, through the use of speech analysis, followed by the appropriate coding, transmission, and resynthesis at the receiver, a significant reduction in the data rate can be achieved.

Devices for compressing speech find use in many fields of telecommunications. An exemplary field is wireless communications. The field of wireless communications has many applications including, e.g., cordless telephones, paging, wireless local loops, wireless telephony such as cellular and PCS telephone systems, mobile Internet Protocol (IP) telephony, and satellite communication systems. A particularly important application is wireless telephony for mobile subscribers.

Various over-the-air interfaces have been developed for wireless communication systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile Communications (GSM), and Interim Standard 95 (IS-95). An exemplary wireless telephony communication system is a code division multiple access (CDMA) system. The IS-95 standard and its derivatives, IS-95A, ANSI J-STD-008, IS-95B, proposed third generation standards IS-95C and IS-2000, etc. (referred to collectively herein as IS-95), are promulgated by the Telecommunication Industry Association (TIA) and other well known standards bodies to specify the use of a CDMA over-the-air interface for cellular or PCS telephony communication systems. Exemplary wireless communication systems configured substantially in accordance with the use of the IS-95 standard are described in U.S. Pat. Nos. 5,103,459 and 4,901,307, which are assigned to the assignee of the present invention and fully incorporated herein by reference.

Devices that employ techniques to compress speech by extracting parameters that relate to a model of human speech generation are called speech coders. A speech coder divides the incoming speech signal into blocks of time, or analysis frames. Speech coders typically comprise an encoder and a decoder. The encoder analyzes the incoming speech frame to extract certain relevant parameters, and then quantizes the parameters into binary representation, i.e., to a set of bits or a binary data packet. The data packets are transmitted over the communication channel to a receiver and a decoder. The decoder processes the data packets, unquantizes them to produce the parameters, and resynthesizes the speech frames using the unquantized parameters.

The function of the speech coder is to compress the digitized speech signal into a low-bit-rate signal by removing all of the natural redundancies inherent in speech. The digital compression is achieved by representing the input speech frame with a set of parameters and employing quantization to represent the parameters with a set of bits. If the input speech frame has a number of bits $N_i$ and the data packet produced by the speech coder has a number of bits $N_o$, the compression factor achieved by the speech coder is $C_r=N_i/N_o$. The challenge is to retain high voice quality of the decoded speech while achieving the target compression factor. The performance of a speech coder depends on (1) how well the speech model, or the combination of the analysis and synthesis process described above, performs, and (2) how well the parameter quantization process is performed at the target bit rate of $N_o$ bits per frame. The goal of the speech model is thus to capture the essence of the speech signal, or the target voice quality, with a small set of parameters for each frame.

Perhaps most important in the design of a speech coder is the search for a good set of parameters (including vectors) to describe the speech signal. A good set of parameters requires a low system bandwidth for the reconstruction of a perceptually accurate speech signal. Pitch, signal power, spectral envelope (or formants), amplitude spectra, and phase spectra are examples of the speech coding parameters.

Speech coders may be implemented as time-domain coders, which attempt to capture the time-domain speech waveform by employing high time-resolution processing to encode small segments of speech (typically 5 millisecond (ms) subframes) at a time. For each subframe, a high-precision representative from a codebook space is found by means of various search algorithms known in the art. Alternatively, speech coders may be implemented as frequency-domain coders, which attempt to capture the short-term speech spectrum of the input speech frame with a set of parameters (analysis) and employ a corresponding synthesis process to recreate the speech waveform from the spectral parameters. The parameter quantizer preserves the parameters by representing them with stored representations of code vectors in accordance with known quantization techniques described in A. Gersho & R. M. Gray, *Vector Quantization and Signal Compression* (1992).

A well-known time-domain speech coder is the Code Excited Linear Predictive (CELP) coder described in L. B. Rabiner & R. W. Schafer, *Digital Processing of speech Signals* 396453 (1978), which is fully incorporated herein by reference. In a CELP coder, the short term correlations, or redundancies, in the speech signal are removed by a linear prediction (LP) analysis, which finds the coefficients of a short-term formant filter. Applying the short-term prediction filter to the incoming speech frame generates an LP residue signal, which is further modeled and quantized with long-term prediction filter parameters and a subsequent stochastic codebook. Thus, CELP coding divides the task of encoding the time-domain speech waveform into the separate tasks of encoding the LP short-term filter coefficients and encoding the LP residue. Time-domain coding can be performed at a fixed rate (i.e., using the same number of bits, $N_0$, for each frame) or at a variable rate (in which different bit rates are used for different types of frame contents). Variable-rate coders attempt to use only the amount of bits needed to encode the codec parameters to a level adequate to obtain a target quality. An exemplary variable rate CELP coder is described in U.S. Pat. No. 5,414,796, which is assigned to the assignee of the present invention and fully incorporated herein by reference.

Time-domain coders such as the CELP coder typically rely upon a high number of bits, $N_0$, per frame to preserve the accuracy of the time-domain speech waveform. Such coders typically deliver excellent voice quality provided the number of bits, $N_0$, per frame is relatively large (e.g., 8 kbps or above). However, at low bit rates (4 kbps and below), time-domain coders fail to retain high quality and robust performance due to the limited number of available bits. At low bit rates, the limited codebook space clips the waveform-matching capability of conventional time-domain coders, which are so successfully deployed in higher-rate commercial applications. Hence, despite improvements over time, many CELP coding systems operating at low bit rates suffer from perceptually significant distortion typically characterized as noise.

There is presently a surge of research interest and strong commercial need to develop a high-quality speech coder operating at medium to low bit rates (i.e., in the range of 2.4 to 4 kbps and below). The application areas include wireless telephony, satellite communications, Internet telephony, various multimedia and voice-streaming applications, voice mail, and other voice storage systems. The driving forces are the need for high capacity and the demand for robust performance under packet loss situations. Various recent speech coding standardization efforts are another direct driving force propelling research and development of low-rate speech coding algorithms. A low-rate speech coder creates more channels, or users, per allowable application bandwidth, and a low-rate speech coder coupled with an additional layer of suitable channel coding can fit the overall bit-budget of coder specifications and deliver a robust performance under channel error conditions.

One effective technique to encode speech efficiently at low bit rates is multimode coding. An exemplary multimode coding technique is described in U.S. application Ser. No. 09/217,341, entitled VARIABLE RATE SPEECH CODING, filed Dec. 21, 1998, now U.S. Pat. No. 6,691,084, issued Feb. 10, 2004, assigned to the assignee of the present invention, and fully incorporated herein by reference. Conventional multimode coders apply different modes, or encoding-decoding algorithms, to different types of input speech frames. Each mode, or encoding-decoding process, is customized to optimally represent a certain type of speech segment, such as, e.g., voiced speech, unvoiced speech, transition speech (e.g., between voiced and unvoiced), and background noise (silence, or nonspeech) in the most efficient manner. An external, open-loop mode decision mechanism examines the input speech frame and makes a decision regarding which mode to apply to the frame. The open-loop mode decision is typically performed by extracting a number of parameters from the input frame, evaluating the parameters as to certain temporal and spectral characteristics, and basing a mode decision upon the evaluation.

Coding systems that operate at rates on the order of 2.4 kbps are generally parametric in nature. That is, such coding systems operate by transmitting parameters describing the pitch-period and the spectral envelope (or formants) of the speech signal at regular intervals. Illustrative of these so-called parametric coders is the LP vocoder system.

LP vocoders model a voiced speech signal with a single pulse per pitch period. This basic technique may be augmented to include transmission information about the spectral envelope, among other things. Although LP vocoders provide reasonable performance generally, they may introduce perceptually significant distortion, typically characterized as buzz.

In recent years, coders have emerged that are hybrids of both waveform coders and parametric coders. Illustrative of these so-called hybrid coders is the prototype-waveform interpolation (PWI) speech coding system. The PWI coding system may also be known as a prototype pitch period (PPP) speech coder. A PWI coding system provides an efficient method for coding voiced speech. The basic concept of PWI is to extract a representative pitch cycle (the prototype waveform) at fixed intervals, to transmit its description, and to reconstruct the speech signal by interpolating between the prototype waveforms. The PWI method may operate either on the LP residual signal or on the speech signal. An exemplary PWI, or PPP, speech coder is described in U.S. application Ser. No. 09/217,494, entitled PERIODIC SPEECH CODING, filed Dec. 21, 1998, now U.S. Pat. No. 6,456,964, issued Sep. 24, 2002, assigned to the assignee of the present invention, and fully incorporated herein by reference. Other PWI, or PPP, speech coders are described in U.S. Pat. No. 5,884,253 and W. Bastiaan Kleijn & Wolfgang Granzow, Methods for Waveform Interpolation in Speech Coding, in 1 Digital Signal Processing 215-230 (1991).

In most conventional speech coders, the parameters of a given pitch prototype, or of a given frame, are each individually quantized and transmitted by the encoder. In addition, a difference value is transmitted for each parameter. The difference value specifies the difference between the parameter value for the current frame or prototype and the parameter value for the previous frame or prototype. However, quantizing the parameter values and the difference values requires using bits (and hence bandwidth). In a low-bit-rate speech coder, it is advantageous to transmit the least number of bits possible to maintain satisfactory voice quality. For this reason, in conventional low-bit-rate speech coders, only the absolute parameter values are quantized and transmitted. It would be desirable to decrease the number of bits transmitted without decreasing the informational value. Thus, there is a need for a predictive scheme for quantizing voiced speech that decreases the bit rate of a speech coder.

SUMMARY OF THE INVENTION

The present invention is directed to a predictive scheme for quantizing voiced speech that decreases the bit rate of a speech coder. Accordingly, in one aspect of the invention, a method of quantizing information about a parameter of speech is provided. The method advantageously includes generating at least one weighted value of the parameter for at least one previously processed frame of speech, wherein the sum of all weights used is one; subtracting the at least one weighted value from a value of the parameter for a currently processed frame of speech to yield a difference value; and quantizing the difference value.

In another aspect of the invention, a speech coder configured to quantize information about a parameter of speech is provided. The speech coder advantageously includes means for generating at least one weighted value of the parameter for at least one previously processed frame of speech, wherein the sum of all weights used is one; means for subtracting the at least one weighted value from a value of the parameter for a currently processed frame of speech to yield a difference value; and means for quantizing the difference value.

In another aspect of the invention, an infrastructure element configured to quantize information about a parameter of speech is provided. The infrastructure element advantageously includes a parameter generator configured to generate at least one weighted value of the parameter for at least one previously processed frame of speech, wherein the sum of all weights used is one; and a quantizer coupled to the parameter generator and configured to subtract the at least one weighted value from a value of the parameter for a currently processed frame of speech to yield a difference value, and to quantize the difference value.

In another aspect of the invention, a subscriber unit configured to quantize information about a parameter of speech is provided. The subscriber unit advantageously includes a processor; and a storage medium coupled to the processor and containing a set of instructions executable by the processor to generate at least one weighted value of the parameter for at least one previously processed frame of speech, wherein the sum of all weights used is one, and subtract the at least one weighted value from a value of the parameter for a currently processed frame of speech to yield a difference value, and to quantize the difference value.

In another aspect of the invention, a method of quantizing information about a phase parameter of speech is provided. The method advantageously includes generating at least one modified value of the phase parameter for at least one previously processed frame of speech; applying a number of phase shifts to the at least one modified value, the number of phase shifts being greater than or equal to zero; subtracting the at least one modified value from a value of the phase parameter for a currently processed frame of speech to yield a difference value; and quantizing the difference value.

In another aspect of the invention, a speech coder configured to quantize information about a phase parameter of speech is provided. The speech coder advantageously includes means for generating at least one modified value of the phase parameter for at least one previously processed frame of speech; means for applying a number of phase shifts to the at least one modified value, the number of phase shifts being greater than or equal to zero; means for subtracting the at least one modified value from a value of the phase parameter for a currently processed frame of speech to yield a difference value; and means for quantizing the difference value.

In another aspect of the invention, a subscribed unit configured to quantize information about a phase parameter of speech is provided. The subscriber unit advantageously includes a processor; and a storage medium coupled to the processor and containing a set of instructions executable by the processor to generate at least one modified value of the phase parameter for at least one previously processed frame of speech, apply a number of phase shifts to the at least one modified value, the number of phase shifts being greater than or equal to zero, subtract the at least one modified value from a value of the parameter for a currently processed frame of speech to yield a difference value, and to quantize the difference value.

DETAILED DESCRIPTION OF THE PREFERRED EMBODIMENTS

The exemplary embodiments described hereinbelow reside in a wireless telephony communication system configured to employ a CDMA over-the-air interface. Nevertheless, it would be understood by those skilled in the art that a method and apparatus for predictively coding voiced speech embodying features of the instant invention may reside in any of various communication systems employing a wide range of technologies known to those of skill in the art.

Figure 1:
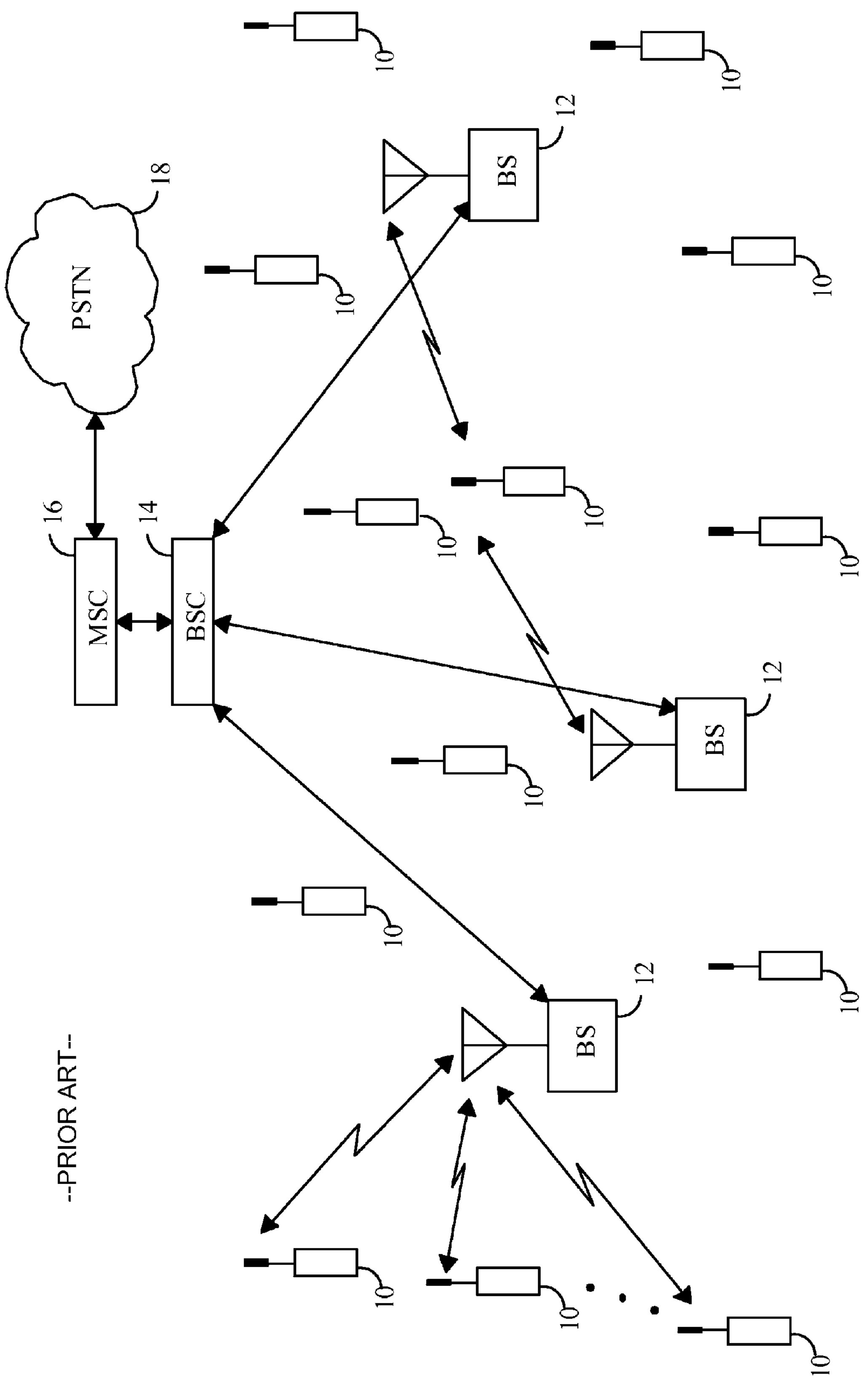
FIG. 1 is a block diagram of a wireless telephone system.

As illustrated in FIG. 1, a CDMA wireless telephone system generally includes a plurality of mobile subscriber units 10, a plurality of base stations 12, base station controllers (BSCs) 14, and a mobile switching center (MSC) 16. The MSC 16 is configured to interface with a conventional public switch telephone network (PSTN) 18. The MSC 16 is also configured to interface with the BSCs 14. The BSCs 14 are coupled to the base stations 12 via backhaul lines. The backhaul lines may be configured to support any of several known interfaces including, e.g., E1/T1, ATM, IP, PPP, Frame Relay, HDSL, ADSL, or xDSL. It is understood that there may be more than two, BSCs 14 in the system. Each base station 12 advantageously includes at least one sector (not shown), each sector comprising an omnidirectional antenna or an antenna pointed in a particular direction radially away from the base station 12. Alternatively, each sector may comprise two antennas for diversity reception. Each base station 12 may advantageously be designed to support a plurality of frequency assignments. The intersection of a sector and a frequency assignment may be referred to as a CDMA channel. The base stations 12 may also be known as base station transceiver subsystems (BTSs) 12. Alternatively, "base station" may be used in the industry to refer collectively to a BSC 14 and one or more BTSs 12. The BTSs 12 may also be denoted "cell sites" 12. Alternatively, individual sectors of a given BTS 12 may be referred to as cell sites. The mobile subscriber units 10 are typically cellular or PCS telephones 10. The system is advantageously configured for use in accordance with the IS-95 standard.

During typical operation of the cellular telephone system, the base stations 12 receive sets of reverse link signals from sets of mobile units 10. The mobile units 10 are conducting telephone calls or other communications. Each reverse link signal received by a given base station 12 is processed within that base station 12. The resulting data is forwarded to the BSCs 14. The BSCs 14 provide call resource allocation and mobility management functionality including the orchestration of soft handoffs between base stations 12. The BSCs 14 also route the received data to the MSC 16, which provides additional routing services for interface with the PSTN 18. Similarly, the PSTN 18 interfaces with the MSC 16, and the MSC 16 interfaces with the BSCs 14, which in turn control the base stations 12 to transmit sets of forward link signals to sets of mobile units 10. It should be understood by those of skill that the subscriber units 10 may be fixed units in alternate embodiments.

Figure 2:
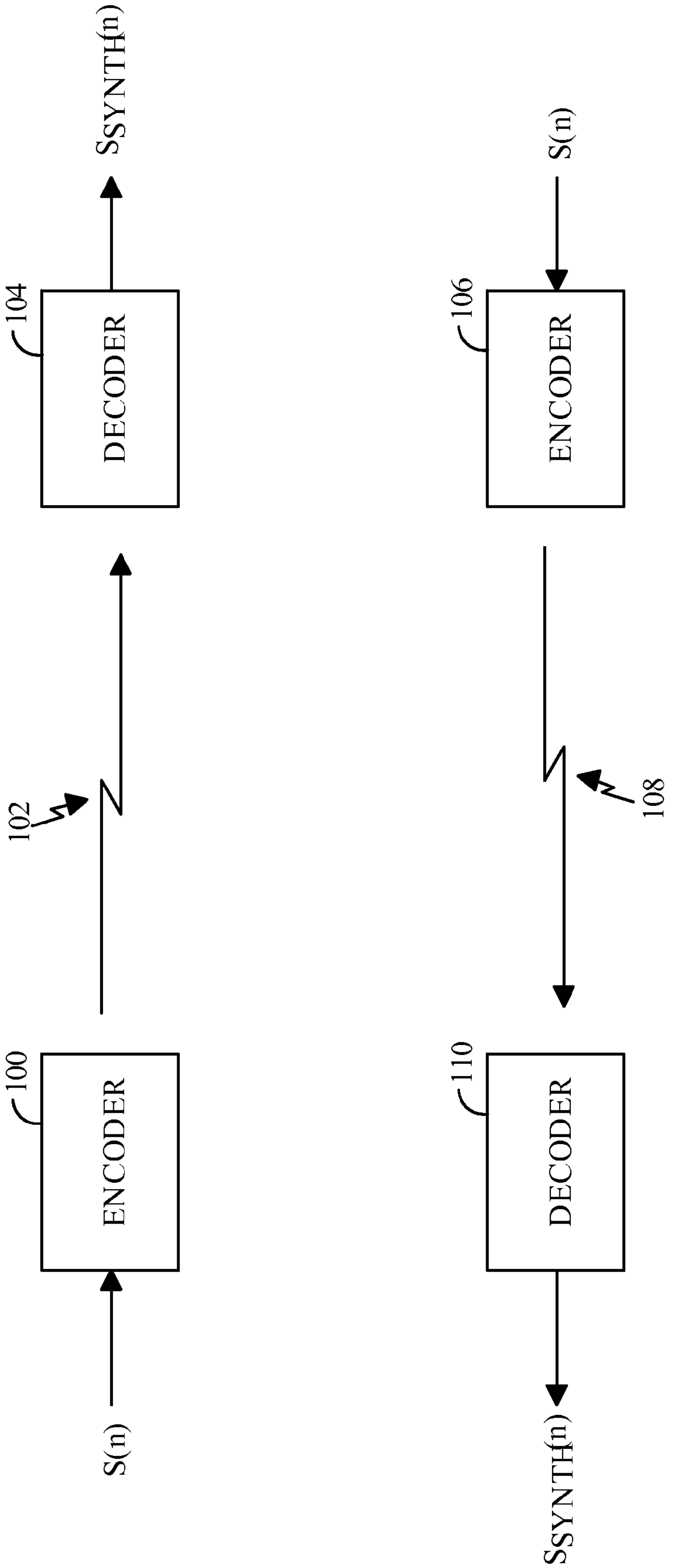
FIG. 2 is a block diagram of a communication channel terminated at each end by speech coders.

In FIG. 2 a first encoder 100 receives digitized speech samples s(n) and encodes the samples s(n) for transmission on a transmission medium 102, or communication channel 102, to a first decoder 104. The decoder 104 decodes the encoded speech samples and synthesizes an output speech signal $S_{SYNTH}(n)$. For transmission in the opposite direction, a second encoder 106 encodes digitized speech samples s(n), which are transmitted on a communication channel 108. A second decoder 110 receives and decodes the encoded speech samples, generating a synthesized output speech signal $S_{SYNTH}(n)$.

The speech samples s(n) represent speech signals that have been digitized and quantized in accordance with any of various methods known in the art including, e.g., pulse code modulation (PCM), companded μ-law, or A-law. As known in the art, the speech samples s(n) are organized into frames of input data wherein each frame comprises a predetermined number of digitized speech samples s(n). In an exemplary embodiment, a sampling rate of 8 kHz is employed, with each 20 ms frame comprising 160 samples. In the embodiments described below, the rate of data transmission may advantageously be varied on a frame-by-frame basis from full rate to (half rate to quarter rate to eighth rate. Varying the data transmission rate is advantageous because lower bit rates may be selectively employed for frames containing relatively less speech information. As understood by those skilled in the art, other sampling rates and/or frame sizes may be used. Also in the embodiments described below, the speech encoding (or coding) mode may be varied on a frame-by-frame basis in response to the speech information or energy of the frame.

The first encoder 100 and the second decoder 110 together comprise a first speech coder (encoder/decoder), or speech codec. The speech coder could be used in any communication device for transmitting speech signals, including, e.g., the subscriber units, BTSs, or BSCs described above with reference to FIG. 1. Similarly, the second encoder 106 and the first decoder 104 together comprise a second speech coder. It is understood by those of skill in the art that speech coders may be implemented with a digital signal processor (DSP), an application-specific integrated circuit (ASIC), discrete gate logic, firmware, or any conventional programmable software module and a microprocessor. The software module could reside in RAM memory, flash memory, registers, or any other form of storage medium known in the art. Alternatively, any conventional processor, controller, or state machine could be substituted for the microprocessor. Exemplary ASICs designed specifically for speech coding are described in U.S. Pat. No. 5,727,123, assigned to the assignee of the present invention and fully incorporated herein by reference, and U.S. application Ser. No. 08/197,417, entitled VOCODER ASIC, filed Feb. 16, 1994, now U.S. Pat. No. 5,784,532, issued Jul. 21, 1998, assigned to the assignee of the present invention, and fully incorporated herein by reference.

Figure 3:
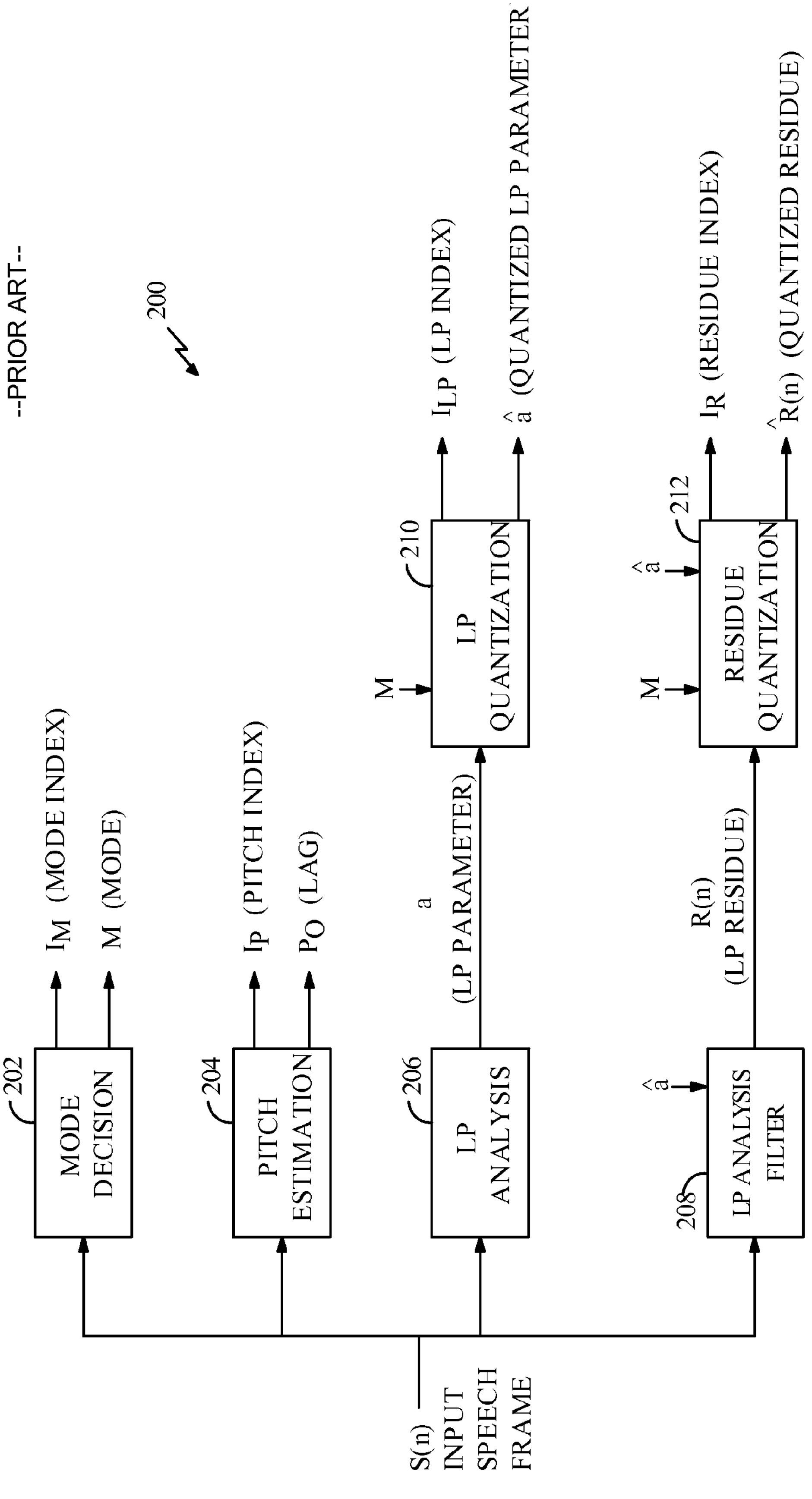
FIG. 3 is a block diagram of a speech encoder.

In FIG. 3 an encoder 200 that may be used in a speech coder includes a mode decision module 202, a pitch estimation module 204, an LP analysis module 206, an LP analysis filter 208, an LP quantization module 210, and a residue quantization module 212. Input speech frames s(n) are provided to the mode decision module 202, the pitch estimation module 204, the LP analysis module 206, and the LP analysis filter 208. The mode decision module 202 produces a mode index IM and a mode M based upon the periodicity, energy, signal-to-noise ratio (SNR), or zero crossing rate, among other features, of each input speech frame s(n). Various methods of classifying speech frames according to periodicity are described in U.S. Pat. No. 5,911,128, which is assigned to the assignee of the present invention and fully incorporated herein by reference. Such methods are also incorporated into the Telecommunication Industry Association Interim Standards TIA/EIA IS-127 and TIA/EIA IS-733. An exemplary mode decision scheme is also described in the aforementioned U.S. Pat. No. 6,691,084.

The pitch estimation module 204 produces a pitch index $I_P$ and a lag value $P_0$ based upon each input speech frame s(n). The LP analysis module 206 performs linear predictive analysis on each input speech frame s(n) to generate an LP parameter a. The LP parameter a is provided to the LP quantization module 210. The LP quantization module 210 also receives the mode M, thereby performing the quantization process in a mode-dependent manner. The LP quantization module 210 produces an LP index $I_{LP}$ and a quantized LP parameter $\hat{\alpha}$. The LP analysis filter 208 receives the quantized LP parameter $\hat{\alpha}$ in addition to the input speech frame s(n). The LP analysis filter 208 generates an LP residue signal R[n], which represents the error between the input speech frames s(n) and the reconstructed speech based on the quantized linear predicted parameters â. The LP residue R[n], the mode M, and the quantized LP parameter a are provided to the residue quantization module 212. Based upon these values, the residue quantization module 212 produces a residue index $I_R$ and a quantized residue signal $\hat{R}[n]$.

Figure 4:
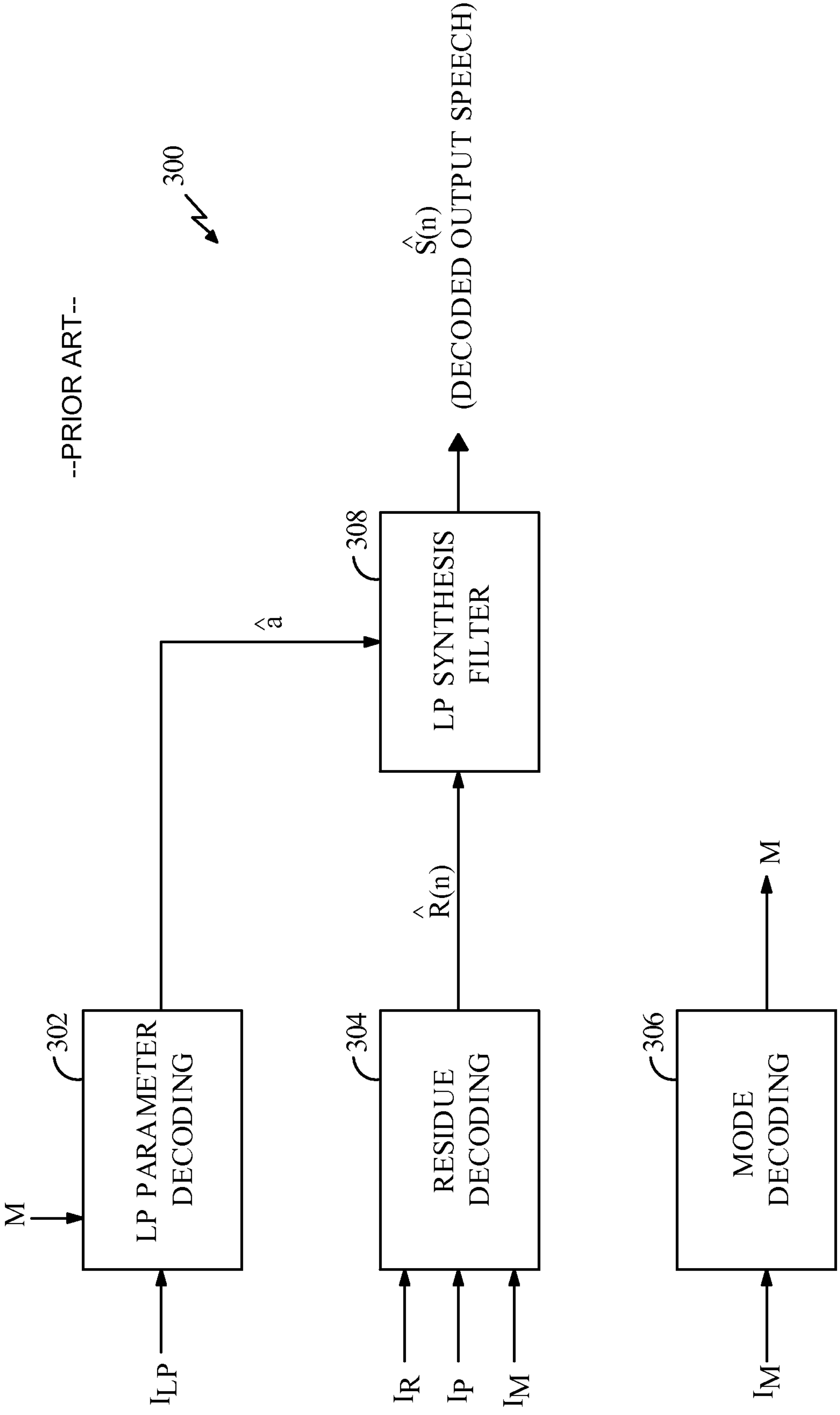
FIG. 4 is a block diagram of a speech decoder.

In FIG. 4 a decoder 300 that may be used in a speech coder includes an LP parameter decoding module 302, a residue decoding module 304, a mode decoding module 306, and an LP synthesis filter 308. The mode decoding module 306 receives and decodes a mode index $I_M$, generating therefrom a mode M. The LP parameter decoding module 302 receives the mode M and an LP index $I_{LP}$. The LP parameter decoding module 302 decodes the received values to produce a quantized LP parameter â. The residue decoding module 304 receives a residue index $I_R$, a pitch index $I_P$, and the mode index $I_M$. The residue decoding module 304 decodes the received values to generate a quantized residue signal $\hat{R}[n]$. The quantized residue signal $\hat{R}[n]$ and the quantized LP parameter â are provided to the LP synthesis filter 308, which synthesizes a decoded output speech signal ŝ[n] therefrom.

Operation and implementation of the various modules of the encoder 200 of FIG. 3 and the decoder 300 of FIG. 4 are known in the art and described in the aforementioned U.S. Pat. No. 5,414,796 and L. B. Rabiner & R. W. Schafer, *Digital Processing of Speech Signals* 396453 (1978).

Figure 5:
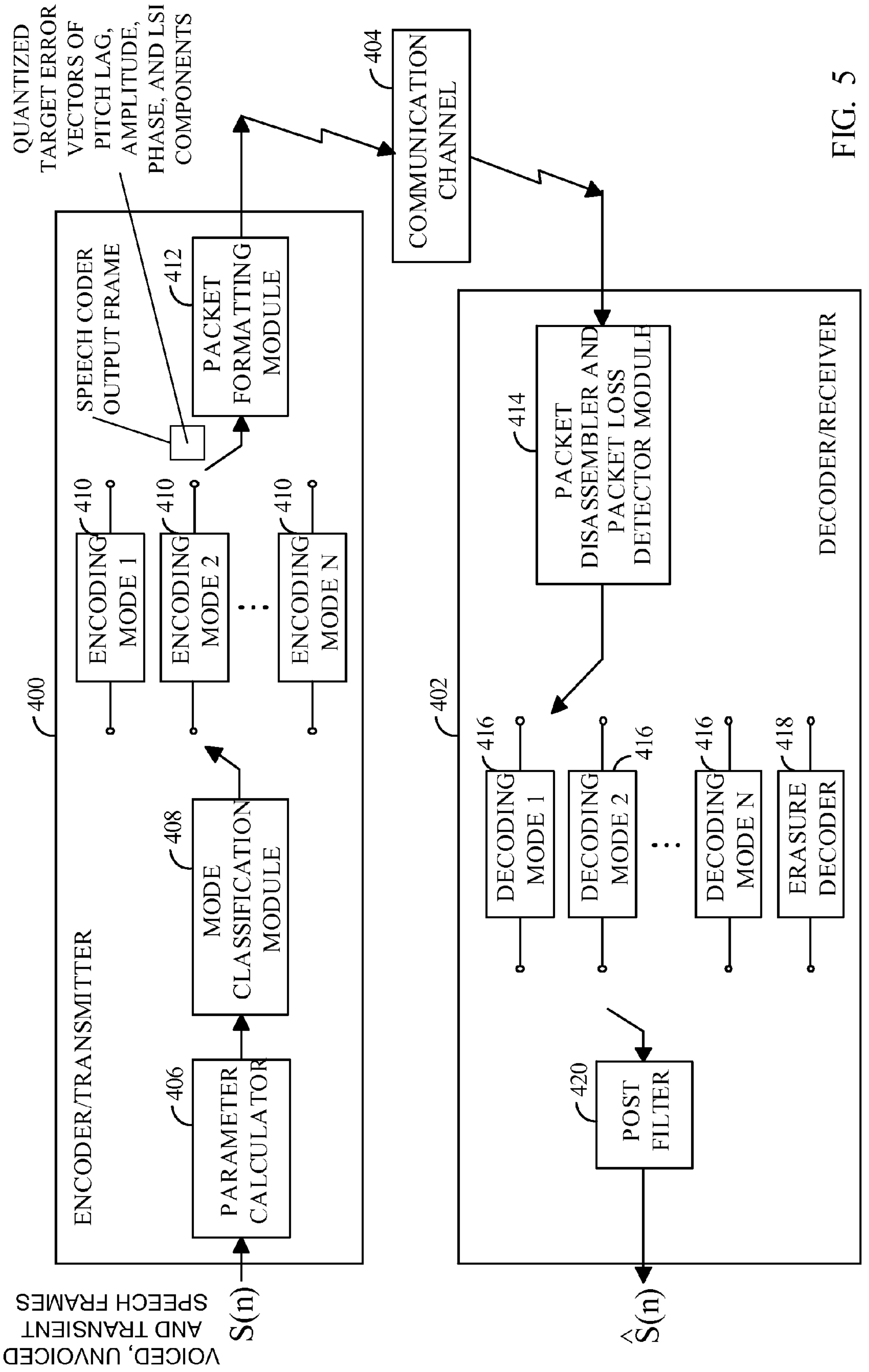
FIG. 5 is a block diagram of a speech coder including encoder/transmitter and decoder/receiver portions.

In one embodiment, illustrated in FIG. 5, a multimode speech encoder 400 communicates with a multimode speech decoder 402 across a communication channel, or transmission medium, 404. The communication channel 404 is advantageously an RF interface configured in accordance with the IS-95 standard. It would be understood by those of skill in the art that the encoder 400 has an associated decoder (not shown). The encoder 400 and its associated decoder together form a first speech coder. It would also be understood by those of skill in the art that the decoder 402 has an associated encoder (not shown). The decoder 402 and its associated encoder together form a second speech coder. The first and second speech coders may advantageously be implemented as part of first and second DSPs, and may reside in, e.g., a subscriber unit and a base station in a PCS or cellular telephone system, or in a subscriber unit and a gateway in a satellite system.

The encoder 400 includes a parameter calculator 406, a mode classification module 408, a plurality of encoding modes 410, and a packet formatting module 412. The number of encoding modes 410 is shown as n, which one of skill would understand could signify any reasonable number of encoding modes 410. For simplicity, only three encoding modes 410 are shown, with a dotted line indicating the existence of other encoding modes 410. The decoder 402 includes a packet disassembler and packet loss detector module 414, a plurality of decoding modes 416, an erasure decoder 418, and a post filter, or speech synthesizer, 420. The number of decoding modes 416 is shown as n, which one of skill would understand could signify any reasonable number of decoding modes 416. For simplicity, only three decoding modes 416 are shown, with a dotted line indicating the existence of other decoding modes 416.

A speech signal, s(n), is provided to the parameter calculator 406. The speech signal is divided into blocks of samples called frames. The value n designates the frame number. In an alternate embodiment, a linear prediction (LP) residual error signal is used in place of the speech signal. The LP residue is used by speech coders such as, e.g., the CELP coder. Computation of the LP residue is advantageously performed by providing the speech signal to an inverse LP filter (not shown). The transfer function of the inverse LP filter, A(z), is computed in accordance with the following equation:

$$A(z)=1-a_1z^{-1}-a_2z^{-2}-\ldots-a_pz^{-p}, \qquad \text{EQ. 1}$$

in which the coefficients $\alpha_1$ are filter taps having predefined values chosen in accordance with known methods, as described in the aforementioned U.S. Pat. No. 5,414,796 and U.S. Pat. No. 6,456,964. The number p indicates the number of previous samples the inverse LP filter uses for prediction purposes. In a particular embodiment, p is set to ten.

The parameter calculator 406 derives various parameters based on the current frame. In one embodiment these parameters include at least one of the following: linear predictive coding (LPC) filter coefficients, line spectral pair (LSP) coefficients, normalized autocorrelation functions (NACFs), open-loop lag, zero crossing rates, band energies, and the formant residual signal. Computation of LPC coefficients, LSP coefficients, open-loop lag, band energies, and the formant residual signal is described in detail in the aforementioned U.S. Pat. No. 5,414,796. Computation of NACFs and zero crossing rates is described in detail in the aforementioned U.S. Pat. No. 5,911,128.

The parameter calculator 406 is coupled to the mode classification module 408. The parameter calculator 406 provides the parameters to the mode classification module 408. The mode classification module 408 is coupled to dynamically switch between the encoding modes 410 on a frame-by-frame basis in order to select the most appropriate encoding mode 410 for the current frame. The mode classification module 408 selects a particular encoding mode 410 for the current frame by comparing the parameters with predefined threshold and/or ceiling values. Based upon the energy content of the frame, the mode classification module 408 classifies the frame as nonspeech, or inactive speech (e.g., silence, background noise, or pauses between words), or speech. Based upon the periodicity of the frame, the mode classification module 408 then classifies speech frames as a particular type of speech, e.g., voiced, unvoiced, or transient.

Figure 6:
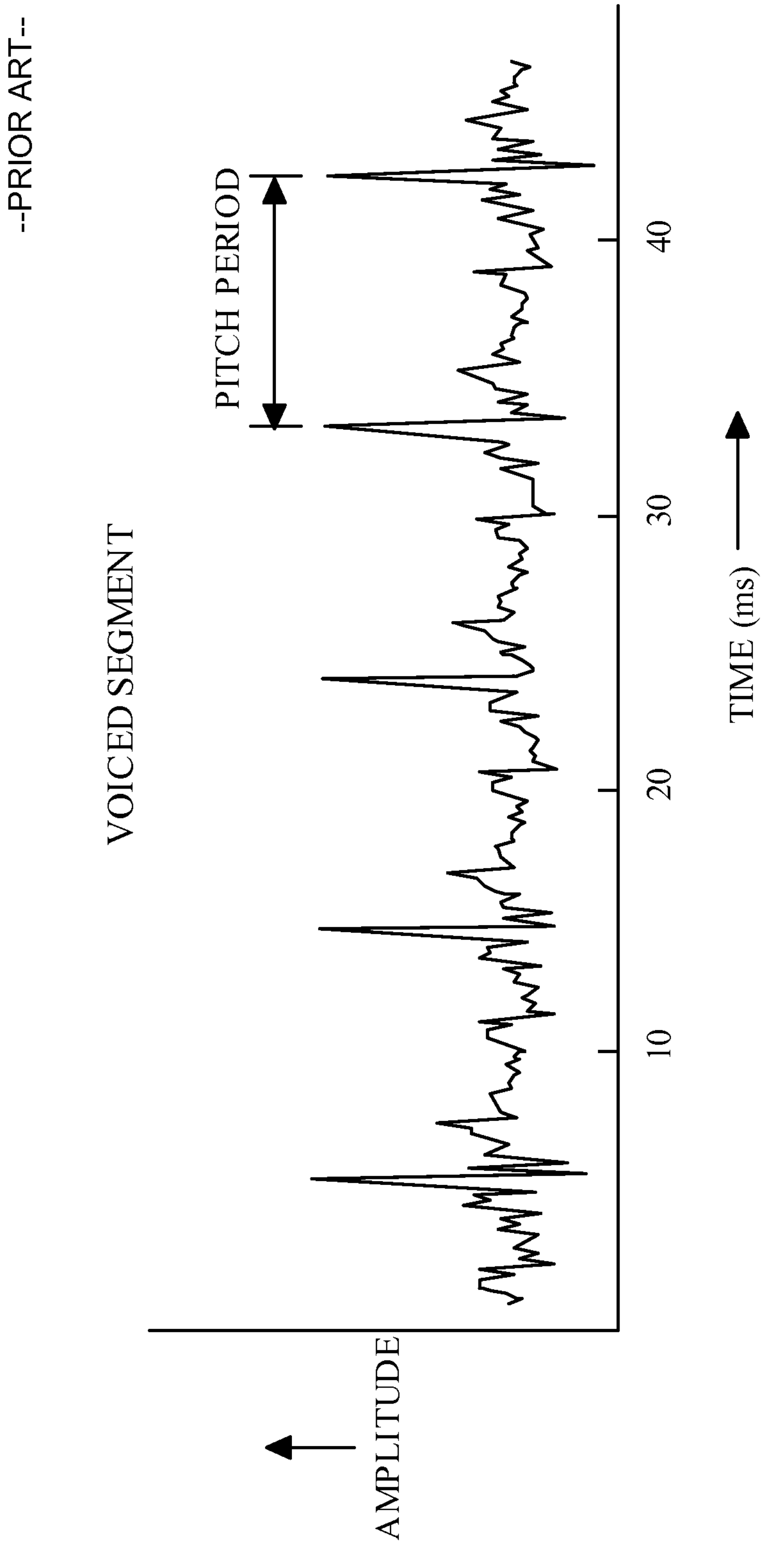
FIG. 6 is a graph of signal amplitude versus time for a segment of voiced speech.

Voiced speech is speech that exhibits a relatively high degree of periodicity. A segment of voiced speech is shown in the graph of FIG. 6. As illustrated, the pitch period is a component of a speech frame that may be used to advantage to analyze and reconstruct the contents of the frame. Unvoiced speech typically comprises consonant sounds. Transient speech frames are typically transitions between voiced and unvoiced speech. Frames that are classified as neither voiced nor unvoiced speech are classified as transient speech. It would be understood by those skilled in the art that any reasonable classification scheme could be employed.

Classifying the speech frames is advantageous because different encoding modes 410 can be used to encode different types of speech, resulting in more efficient use of bandwidth in a shared channel such as the communication channel 404. For example, as voiced speech is periodic and thus highly predictive, a low-bit-rate, highly predictive encoding mode 410 can be employed to encode voiced speech. Classification modules such as the classification module 408 are described in detail in the aforementioned U.S. Pat. No. 6,691,084 and in U.S. application Ser. No. 09/259,151 entitled CLOSED-LOOP MULTIMODE MIXED-DOMAIN LINEAR PREDICTION (MDLP) SPEECH CODER, filed Feb. 26, 1999, now U.S. Pat. No. 6,640,209, issued Oct. 28, 2003, assigned to the assignee of the present invention, and fully incorporated herein by reference.

The mode classification module 408 selects an encoding mode 410 for the current frame based upon the classification of the frame. The various encoding modes 410 are coupled in parallel. One or more of the encoding modes 410 may be operational at any given time. Nevertheless, only one encoding mode 410 advantageously operates at any given time, and is selected according to the classification of the current frame.

The different encoding modes 410 advantageously operate according to different coding bit rates, different coding schemes, or different combinations of coding bit rate and coding scheme. The various coding rates used may be full rate, half rate, quarter rate, and/or eighth rate. The various coding schemes used may be CELP coding, prototype pitch period (PPP) coding (or waveform interpolation (WI) coding), and/or noise excited linear prediction (NELP) coding. Thus, for example, a particular encoding mode 410 could be full rate CELP, another encoding mode 410 could be half rate CELP, another encoding mode 410 could be quarter rate PPP, and another encoding mode 410 could be NELP.

In accordance with a CELP encoding mode 410, a linear predictive vocal tract model is excited with a quantized version of the LP residual signal. The quantized parameters for the entire previous frame are used to reconstruct the current frame. The CELP encoding mode 410 thus provides for relatively accurate reproduction of speech but at the cost of a relatively high coding bit rate. The CELP encoding mode 410 may advantageously be used to encode frames classified as transient speech. An exemplary variable rate CELP speech coder is described in detail in the aforementioned U.S. Pat. No. 5,414,796.

In accordance with a NELP encoding mode 410, a filtered, pseudo-random noise signal is used to model the speech frame. The NELP encoding mode 410 is a relatively simple technique that achieves a low bit rate. The NELP encoding mode 410 may be used to advantage to encode frames classified as unvoiced speech. An exemplary NELP encoding mode is described in detail in the aforementioned U.S. Pat. No. 6,456,964.

In accordance with a PPP encoding mode 410, only a subset of the pitch periods within each frame are encoded. The remaining periods of the speech signal are reconstructed by interpolating between these prototype periods. In a time-domain implementation of PPP coding, a first set of parameters is calculated that describes how to modify a previous prototype period to approximate the current prototype period. One or more codevectors are selected which, when summed, approximate the difference between the current prototype period and the modified previous prototype period. A second set of parameters describes these selected codevectors. In a frequency-domain implementation of PPP coding, a set of parameters is calculated to describe amplitude and phase spectra of the prototype. This may be done either in an absolute sense, or predictively as described hereinbelow. In either implementation of PPP coding, the decoder synthesizes an output speech signal by reconstructing a current prototype based upon the first and second sets of parameters. The speech signal is then interpolated over the region between the current reconstructed prototype period and a previous reconstructed prototype period. The prototype is thus a portion of the current frame that will be linearly interpolated with prototypes from previous frames that were similarly positioned within the frame in order to reconstruct the speech signal or the LP residual signal at the decoder (i.e., a past prototype period is used as a predictor of the current prototype period). An exemplary PPP speech coder is described in detail in the aforementioned U.S. Pat. No. 6,456,964.

Coding the prototype period rather than the entire speech frame reduces the required coding bit rate. Frames classified as voiced speech may advantageously be coded with a PPP encoding mode 410. As illustrated in FIG. 6, voiced speech contains slowly time-varying, periodic components that are exploited to advantage by the PPP encoding mode 410. By exploiting the periodicity of the voiced speech, the PPP encoding mode 410 is able to achieve a lower bit rate than the CELP encoding mode 410.

The selected encoding mode 410 is coupled to the packet formatting module 412. The selected encoding mode 410 encodes, or quantizes, the current frame and provides the quantized frame parameters to the packet formatting module 412. The packet formatting module 412 advantageously assembles the quantized information into packets for transmission over the communication channel 404. In one embodiment the packet formatting module 412 is configured to provide error correction coding and format the packet in accordance with the IS-95 standard. The packet is provided to a transmitter (not shown), converted to analog format, modulated, and transmitted over the communication channel 404 to a receiver (also not shown), which receives, demodulates, and digitizes the packet, and provides the packet to the decoder 402.

In the decoder 402, the packet disassembler and packet loss detector module 414 receives the packet from the receiver. The packet disassembler and packet loss detector module 414 is coupled to dynamically switch between the decoding modes 416 on a packet-by-packet basis. The number of decoding modes 416 is the same as the number of encoding modes 410, and as one skilled in the art would recognize, each numbered encoding mode 410 is associated with a respective similarly numbered decoding mode 416 configured to employ the same coding bit rate and coding scheme.

If the packet disassembler and packet loss detector module 414 detects the packet, the packet is disassembled and provided to the pertinent decoding mode 416. If the packet disassembler and packet loss detector module 414 does not detect a packet, a packet loss is declared and the erasure decoder 418 advantageously performs frame erasure processing as described in a related U.S. Pat. No. 6,584,438, entitled FRAME ERASURE COMPENSATION METHOD IN A VARIABLE RATE SPEECH CODER, issued Jun. 24, 2003, assigned to the assignee of the present invention, and fully incorporated herein by reference.

The parallel array of decoding modes 416 and the erasure decoder 418 are coupled to the post filter 420. The pertinent decoding mode 416 decodes, or de-quantizes, the packet and provides the information to the post filter 420. The post filter 420 reconstructs, or synthesizes, the speech frame, outputting synthesized speech frames, ŝ(n). Exemplary decoding modes and post filters are described in detail in the aforementioned U.S. Pat. No. 5,414,796 and U.S. Pat. No. 6,456,964.

In one embodiment the quantized parameters themselves are not transmitted. Instead, codebook indices specifying addresses in various lookup tables (LUTs) (not shown) in the decoder 402 are transmitted. The decoder 402 receives the codebook indices and searches the various codebook LUTs for appropriate parameter values. Accordingly, codebook indices for parameters such as, e.g., pitch lag, adaptive codebook gain, and LSP may be transmitted, and three associated codebook LUTs are searched by the decoder 402.

In accordance with a CELP encoding mode 410, pitch lag, amplitude, phase, and LSP parameters are transmitted. The LSP codebook indices are transmitted because the LP residue signal is to be synthesized at the decoder 402. Additionally, the difference between the pitch lag value for the current frame and the pitch lag value for the previous frame is transmitted.

In accordance with a conventional PPP encoding mode in which the speech signal is to be synthesized at the decoder, only the pitch lag, amplitude, and phase parameters are transmitted. The lower bit rate employed by conventional PPP speech coding techniques does not permit transmission of both absolute pitch lag information and relative pitch lag difference values.

In accordance with one embodiment, highly periodic frames such as voiced speech frames are transmitted with a low-bit-rate PPP encoding mode 410 that quantizes the difference between the pitch lag value for the current frame and the pitch lag value for the previous frame for transmission, and does not quantize the pitch lag value for the current frame for transmission. Because voiced frames are highly periodic in nature, transmitting the difference value as opposed to the absolute pitch lag value allows a lower coding bit rate to be achieved. In one embodiment this quantization is generalized such that a weighted sum of the parameter values for previous frames is computed, wherein the sum of the weights is one, and the weighted sum is subtracted from the parameter value for the current frame. The difference is then quantized.

In one embodiment, predictive quantization of LPC parameters is performed in accordance with the following description. The LPC parameters are converted into line spectral information (LSI) (or LSPs), which are known to be more suitable for quantization. The N-dimensional LSI vector for the $M^{th}$ frame may be denoted as $L_M \equiv L_M^n$; n×0,1, . . . N−1. In the predictive quantization scheme, the target error vector, T, for quantization is computed in accordance with the following equation:

$$T_M^n = \frac{\left(L_M^n - \beta_1^n \hat{U}_{M-1}^n - \beta_2^n \hat{U}_{M-2}^n - \ldots - \beta_P^n \hat{U}_{M-P}^n\right)}{\beta_0^n}; \quad \text{EQ. 2}$$

$$n = 0, 1, \ldots, N-1,$$

in which $L_M^n$ is the unquantized N-dimensional LSI vector for the $M^{th}$ frame; the values $\{\hat{U}_{M-1}^n, \hat{U}_M^n, \ldots, \hat{U}_{M-P}^n;\ n=0, 1, \ldots, N-1\}$ are the contributions of the LSI parameters of a number of frames, P, immediately prior to frame M; and the values $\{\beta_1^n, \beta_2^n, \ldots, \beta_P^n;\ n=0,1, \ldots, N-1\}$ are respective weights such that $\{\beta_0^n+\beta_1^n+, \ldots, +\beta_P^n=1;\ n=0,1, \ldots, N-1\}$.

The contributions, Û, can be equal to the quantized or unquantized LSI parameters of the corresponding past frame. Such a scheme is known as an auto regressive (AR) method. Alternatively, the contributions, Û, can be equal to the quantized or unquantized error vector corresponding to the LSI parameters of the corresponding past frame. Such a scheme is known as a moving average (MA) method.

The target error vector, T, is then quantized to $\hat{T}$ using any of various known vector quantization (VQ) techniques including, e.g., split VQ or multistage VQ. Various VQ techniques are generally described in A. Gersho & R. M. Gray, *Vector Quantization and Signal Compression* (1992). The quantized LSI vector is then reconstructed from the quantized target error vector, $\hat{T}$, using the following equation:

$$\hat{L}_M{}^n = \beta_0{}^n \hat{T}_M{}^n + \beta_1{}^n \hat{U}_{M-1}{}^n + \beta_2{}^n \hat{U}_{M-2}{}^n + \ldots + \beta_P{}^n \hat{U}_{M-P}{}^n; \quad n = 0, 1, \ldots, N-1. \qquad \text{EQ. 3}$$

In one embodiment the above-described quantization scheme provided by EQ. 2 is implemented with P=2, N=0, and $$T_M^n = \frac{\left(L_M^n - 0.4\hat{T}_{M-1}^n - 0.2\hat{U}_{M-2}^n\right)}{0.4}; \quad n = 0, 1, \ldots, 9. \qquad \text{EQ. 4}$$

The above-listed target vector, T, may advantageously be quantized using sixteen bits through the well known split VQ method.

Due to their periodic nature, voiced frames can be coded using a scheme in which the entire set of bits is used to quantize one prototype pitch period, or a finite set of prototype pitch periods, of the frame of a known length. This length of the prototype pitch period is called the pitch lag. These prototype pitch periods, and possibly the prototype pitch periods of adjacent frames, may then be used to reconstruct the entire speech frame without loss of perceptual quality. This PPP scheme of extracting the prototype pitch period from a frame of speech and using these prototypes for reconstructing the entire frame is described in the aforementioned U.S. Pat. No. 6,456,964.

Figure 7:
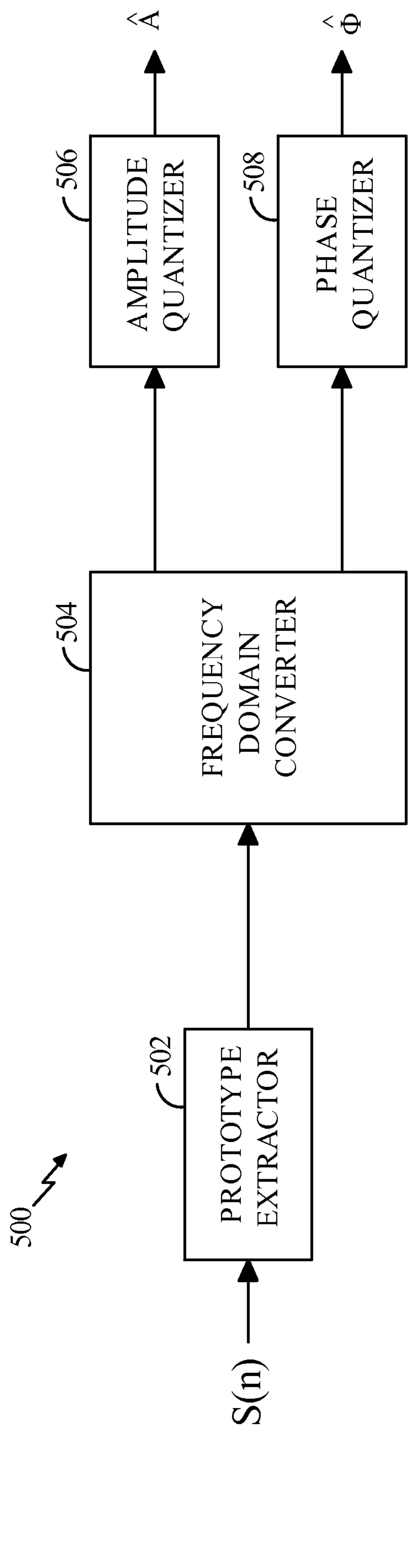
FIG. 7 is a block diagram of a quantizer that can be used in a speech encoder.

In one embodiment a quantizer 500 is used to quantize highly periodic frames such as voiced frames in accordance with a PPP coding scheme, as shown in FIG. 7. The quantizer 500 includes a prototype extractor 502, a frequency domain converter 504, an amplitude quantizer 506, and a phase quantizer 508. The prototype extractor 502 is coupled to the frequency domain converter 504. The frequency domain converter 504 is coupled to the amplitude quantizer 506 and to the phase quantizer 508.

The prototype extractor 502 extracts a pitch period prototype from a frame of speech, s(n). In an alternate embodiment, the frame is a frame of LP residue. The prototype extractor 502 provides the pitch period prototype to the frequency domain converter 504. The frequency domain converter 504 transforms the prototype from a time-domain representation to a frequency-domain representation in accordance with any of various known methods including, e.g., discrete Fourier transform (DFT) or fast Fourier transform (FFT). The frequency domain converter 504 generates an amplitude vector and a phase vector. The amplitude vector is provided to the amplitude quantizer 506, and the phase vector is provided to the phase quantizer 508. The amplitude quantizer 506 quantizes the set of amplitudes, generating a quantized amplitude vector, $\hat{A}$, and the phase quantizer 508 quantizes the set of phases, generating a quantized phase vector, $\hat{\Phi}$.

Other schemes for coding voiced frames, such as, e.g., multiband excitation (MBE) speech coding and harmonic coding, transform the entire frame (either LP residue or speech) or parts thereof into frequency-domain values through Fourier transform representations comprising amplitudes and phases that can be quantized and used for synthesis into speech at the decoder (not shown). To use the quantizer of FIG. 7 with such coding schemes, the prototype extractor 502 is omitted, and the frequency domain converter 504 serves to decompose the complex short-term frequency spectral representations of the frame into an amplitude vector and a phase vector. And in either coding scheme, a suitable windowing function such as, e.g., a Hamming window, may first be applied. An exemplary MBE speech coding scheme is described in D. W. Griffin & J. S. Lim, "Multiband Excitation Vocoder," 36(8) *IEE Trans. on ASSP* (August 1988). An exemplary harmonic speech coding scheme is described in L. B. Almeida & J. M. Tribolet, "Harmonic Coding: A Low Bit-Rate, Good Quality, Speech Coding Technique," *Proc. ICASSP* '82 1664-1667 (1982).

Certain parameters must be quantized for any of the above voiced frame coding schemes. These parameters are the pitch lag or the pitch frequency, and the prototype pitch period waveform of pitch lag length, or the short-term spectral representations (e.g., Fourier representations) of the entire frame or a piece thereof.

In one embodiment predictive quantization of the pitch lag or the pitch frequency is performed in accordance with the following description. The pitch frequency and the pitch lag can be uniquely obtained from one another by scaling the reciprocal of the other with a fixed scale factor. Consequently, it is possible to quantize either of these values using the following method. The pitch lag (or the pitch frequency) for the frame 'm' may be denoted $L_m$. The pitch lag, $L_m$, can be quantized to a quantized value, $\hat{L}_m$, according to the following equation:

$$\hat{L}_m = \hat{\delta} L_m + \eta_{m_1} L_{m_1} + \eta_{m_2} L_{m_2} + \ldots + \eta_{m_x} L_{m_x}, \qquad \text{EQ. 5}$$

in which the values $L_{m_1}, L_{m_2} \ldots, L_{m_x}$ are the pitch lags (or the pitch frequencies) for frames $m_1, m_2, \ldots, m_N$, respectively, the values $\eta_{m_1}, \eta_{m_2}, \ldots, \eta_{m_x}$ are corresponding weights, and $\delta L_m$ is obtained from the following equation:

$$\delta L_m = L_m - \eta_{m_1} L_{m_1} - \eta_{m_2} L_{m_2} - \ldots - \eta_{m_N} L_{m_N} \qquad \text{EQ. 6}$$

and quantized to $\hat{\delta} L_m$ using any of various known scalar or vector quantization techniques. In a particular embodiment, a low-bit-rate, voiced speech coding scheme was implemented that quantizes $\delta L_m = L_m - L_{m-1}$ using only four bits.

In one embodiment quantization of the prototype pitch period or the short-term spectrum of the entire frame or parts thereof is performed in accordance with the following description. As discussed above, the prototype pitch period of a voiced frame can be quantized effectively (in either the speech domain or the LP residual domain) by first transforming the time-domain waveform into the frequency domain where the signal can be represented as a vector of amplitudes and phases. All or some elements of the amplitude and phase vectors can then be quantized separately using a combination of the methods described below. Also as mentioned above, in other schemes such as MBE or harmonic coding schemes, the complex short-term frequency spectral representations of the frame can be decomposed into amplitudes and phase vectors. Therefore, the following quantization methods, or suitable interpretations of them, can be applied to any of the above-described coding techniques.

In one embodiment amplitude values may be quantized as follows. The amplitude spectrum may be a fixed-dimension vector or a variable-dimension vector. Further, the amplitude spectrum can be represented as a combination of a lower dimensional power vector and a normalized amplitude spectrum vector obtained by normalizing the original amplitude spectrum with the power vector. The following method can be applied to any, or parts thereof, of the above-mentioned elements (namely, the amplitude spectrum, the power spectrum, or the normalized amplitude spectrum). A subset of the amplitude (or power, or normalized amplitude) vector for frame 'm' may be denoted $A_m$. The amplitude (or power, or normalized amplitude) prediction error vector is first computed using the following equation:

$$\delta A_m = A_m - \alpha_{m_1}^T A_{m_1} - \alpha_{m_2}^T A_{m_2} - \ldots - \alpha_{m_N}^T A_{m_N}, \quad \text{EQ. 7}$$

in which the values $A_{m_1}, A_{m_1}, \ldots, A_{m_N}$ are the subset of the amplitude (or power, or normalized amplitude) vector for frames $m_1, m_2, \ldots, m_N$, respectively, and the values $\alpha_{m_1}^T$, $\alpha_{m_2}^T, \ldots, \alpha_{m_N}^T$ are the transposes of corresponding weight vectors.

The prediction error vector can then be quantized using any of various known VQ methods to a quantized error vector denoted $\delta\hat{A}_m$. The quantized version of $A_m$ is then given by the following equation:

$$\hat{A}_m = \delta\hat{A}_m + \alpha_{m_1}^T A_{m_1} + \alpha_{m_2}^T A_{m_2} + \ldots + \alpha_{m_N}^T A_{m_N}. \quad \text{EQ. 8}$$

The weights $\alpha$ establish the amount of prediction in the quantization scheme. In a particular embodiment, the above-described predictive scheme has been implemented to quantize a two-dimensional power vector using six bits, and to quantize a nineteen-dimensional, normalized amplitude vector using twelve bits. In this manner, it is possible to quantize the amplitude spectrum of a prototype pitch period using a total of eighteen bits.

In one embodiment phase values may be quantized as follows. A subset of the phase vector for frame 'm' may be denoted $\phi_m$. It is possible to quantize $\phi_m$ as being equal to the phase of a reference waveform (time domain or frequency domain of the entire frame or a part thereof), and zero or more linear shifts applied to one or more bands of the transformation of the reference waveform. Such a quantization technique is described in U.S. application Ser. No. 09/356,491, entitled METHOD AND APPARATUS FOR SUBSAMPLING PHASE SPECTRUM INFORMATION, filed Jul. 19, 1999, now U.S. Pat. No. 6,397,175, issued May 28, 2002, assigned to the assignee of the present invention, and fully incorporated herein by reference. Such a reference waveform could be a transformation of the waveform of frame $m_N$, or any other predetermined waveform.

For example, in one embodiment employing a low-bit-rate, voiced speech coding scheme, the LP residue of frame 'm−1' is first extended according to a pre-established pitch contour (as has been incorporated into the Telecommunication Industry Association Interim Standard TIA/EIA IS-127), into the frame 'm.' Then a prototype pitch period is extracted from the extended waveform in a manner similar to the extraction of the unquantized prototype of the frame 'm'. The phases, $\phi_{m-1}'$, of the extracted prototype are then obtained. The following values are then equated: $\phi_m = \phi_{m-1}'$. In this manner it is possible to quantize the phases of the prototype of the frame 'm' by predicting from the phases of a transformation of the waveform of frame 'm−1' using no bits.

In a particular embodiment, the above-described predictive quantization schemes have been implemented to code the LPC parameters and the LP residue of a voiced speech frame using only thirty-eight bits.

Figure 8:
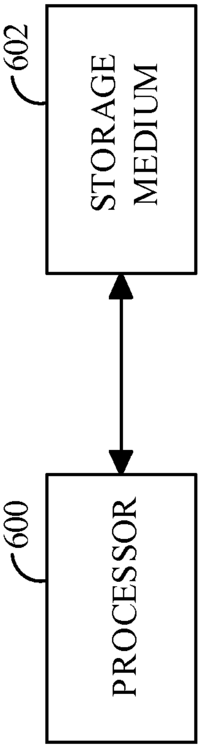
FIG. 8 is a block diagram of a processor coupled to a storage medium.

Thus, a novel and improved method and apparatus for predictively quantizing voiced speech have been described. Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof. Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, or state machine. The software module could reside in RAM memory, flash memory, ROM memory, EPROM memory, EEPROM memory, registers, hard disk, a removable disk, a CD-ROM, or any other form of storage medium known in the art. As illustrated in FIG. 8, an exemplary processor 600 is advantageously coupled to a storage medium 602 so as to read information from, and write information to, the storage medium 602. In the alternative, the storage medium 602 may be integral to the processor 600. The processor 600 and the storage medium 602 may reside in an ASIC (not shown). The ASIC may reside in a telephone (not shown). In the alternative, the processor 600 and the storage medium 602 may reside in a telephone. The processor 600 may be implemented as a combination of a DSP and a microprocessor, or as two microprocessors in conjunction with a DSP core, etc.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. An apparatus comprising:

a processor configured to:

quantize a target error vector obtained from one or more parameters associated with a speech frame;

quantize a difference between a pitch lag value for a current frame and a pitch lag value for a previous frame without quantizing the pitch lag value for the current frame; and form a set of quantized speech frame parameters from the quantized target error vector.

2. The apparatus of claim 1, wherein the one or more parameters include an amplitude component of the speech frame.

3. The apparatus of claim 1, wherein the one or more parameters include a phase value associated with the speech frame.

4. The apparatus of claim 1, wherein the one or more parameters include a linear spectral information component associated with the speech frame.

5. The apparatus of claim 1, wherein the processor is configured to transmit the set of quantized speech frame parameters across a wireless communication channel.

6. The apparatus of claim 1, wherein the one or more parameters have been extracted from a plurality of voiced speech frames.

7. The apparatus of claim 1, wherein the one or more parameters have been extracted from the speech frame, wherein the speech frame comprises a voiced speech frame.

8. The apparatus of claim 1, wherein the target error vector is defined by an equation:

$$T_M^n = \frac{\left(L_M^n - \beta_1^n \hat{U}_{M-1}^n - \beta_2^n \hat{U}_{M-2}^n - \dots - \beta_P^n \hat{U}_{M-P}^n\right)}{\beta_0^n};\ n = 0, 1, \dots, N-1,$$

wherein $L_M^n$ is an unquantized N-dimensional line spectral information (LSI) vector for an $M^{th}$ frame, wherein $\hat{U}_{M-1}^n, \hat{U}_{M-2}^n, \dots, U_{M-P}^n$ are contributions of LSI parameters of a number of frames, P, prior to a frame M, and wherein $\beta_0^n, \beta_1^n, \beta_2^n, \dots, \beta_P^n$ are respective weights such that $\beta_0^n+\beta_1^n+\beta_2^n+, \dots, +\beta_P^n=1$.

9. The apparatus of claim 1, wherein a quantized pitch lag value is defined by an equation:

$$\hat{L}_m=\delta L_m+\eta_{m_1}L_{m_1}+\eta_{m_2}L_{m_2}+\dots+\eta_{m_x}L_{m_x}$$

wherein $L_{m_1}, L_{m_2}, \dots, L_{m_x}$ are pitch lag values for frames $m_1, m_2, \dots, m_N$, respectively, and wherein $\eta_{m_1}, \eta_{m_2}, \dots \eta_{m_x}$ are corresponding weights.

10. The apparatus of claim 1, wherein the processor is further configured to:

quantize an amplitude prediction error vector obtained from the one or more parameters associated with the speech frame, wherein the quantized amplitude prediction error vector is defined by an equation:

$$\hat{A}_m=\delta A_m+\alpha_{m_1}{}^T A_{m_1}+\alpha_{m_2}{}^T A_{m_2}+\dots+\alpha_{m_N}{}^T A_{m_N},$$

wherein $A_{m_1}, A_{m_2}, \dots, A_{m_N}$ are a subset of amplitude vectors for frames $m_1, m_2, \dots, m_N$, respectively, and wherein $\alpha_{m_1}{}^T, \alpha_{m_2}{}^T, \dots, \alpha_{m_N}{}^T$ are transposes of corresponding weight vectors.

11. A method of forming a set of quantized speech frame parameters, the method comprising:

quantizing a target error vector obtained from one or more parameters associated with a speech frame;

quantizing a difference between a pitch lag value for a current frame and a pitch lag value for a previous frame without quantizing the pitch lag value for the current frame; and forming a set of quantized speech frame parameters from the quantized target error vector.

12. The method of claim 11, wherein the one or more parameters include an amplitude component of the speech frame.

13. The method of claim 11, wherein the one or more parameters include a phase value associated with the speech frame.

14. The method of claim 11, wherein the one or more parameters include a linear spectral information component associated with the speech frame.

15. The method of claim 11, further comprising transmitting the set of quantized speech frame parameters across a wireless communication channel.

16. The method of claim 11, wherein the one or more parameters have been extracted from the speech frame, wherein the speech frame comprises a voiced speech frame.

17. An apparatus comprising:

means for quantizing a target error vector obtained from one or more parameters associated with a speech frame;

means for quantizing a difference between a pitch lag value for a current frame and a pitch lag value for a previous frame without quantizing the pitch lag value for the current frame; and means for forming a set of quantized speech frame parameters from the quantized target error vector.

18. The apparatus of claim 17, wherein the one or more parameters include an amplitude component of the speech frame.

19. The apparatus of claim 17, further comprising means to transmit the set of quantized speech frame parameters across a wireless communication channel.

20. A non-transitory computer-readable medium comprising instructions that upon execution in a processor cause the processor to:

quantize a target error vector obtained from one or more parameters associated with a speech frame;

quantize a difference between a pitch lag value for a current frame and a pitch lag value for a previous frame without quantizing the pitch lag value for the current frame; and form a set of quantized speech frame parameters from the quantized target error vector.

21. The computer-readable medium of claim 20, wherein the one or more parameters include a phase value associated with the speech frame.

22. The computer-readable medium of claim 20, wherein the one or more parameters include a linear spectral information component associated with the speech frame.

23. The computer-readable medium of claim 20, further comprising instructions to transmit the set of quantized speech frame parameters across a wireless communication channel.

* * * * *